US012621848B2

(12) United States Patent
Buthler et al.

(10) Patent No.: US 12,621,848 B2
(45) Date of Patent: May 5, 2026

(54) SIDELINK RESOURCE RESELECTION

(71) Applicant: NOKIA TECHNOLOGIES OY, Espoo (FI)

(72) Inventors: Jakob Lindbjerg Buthler, Aalborg (DK); Laura Luque Sanchez, Nibe (DK); Devaki Chandramouli, Plano, TX (US); Faranaz Sabouri-Sichani, Aalborg (DK); Frank Frederiksen, Klarup (DK); Nuno Manuel Kiilerich Pratas, Gistrup (DK)

(73) Assignee: Nokia Technologies, Espoo (FI)

( * ) Notice: Subject to any disclaimer, the term of this patent is extended or adjusted under 35 U.S.C. 154(b) by 342 days.

(21) Appl. No.: 18/252,692

(22) PCT Filed: Oct. 29, 2021

(86) PCT No.: PCT/FI2021/050737
§ 371 (c)(1),
(2) Date: May 11, 2023

(87) PCT Pub. No.: WO2022/101545
PCT Pub. Date: May 19, 2022

(65) Prior Publication Data
US 2024/0008056 A1 Jan. 4, 2024

(30) Foreign Application Priority Data
Nov. 11, 2020 (FI) ..................................... 20206138

(51) Int. Cl.
*H04W 72/25* (2023.01)
*H04W 24/10* (2009.01)
*H04W 72/02* (2009.01)

(52) U.S. Cl.
CPC ........... *H04W 72/25* (2023.01); *H04W 24/10* (2013.01); *H04W 72/02* (2013.01)

(58) Field of Classification Search
CPC ..... H04W 72/25; H04W 24/10; H04W 72/02; H04W 76/14; H04W 4/70; H04W 72/04; H04W 76/19; H04W 76/23; H04L 1/1893
See application file for complete search history.

(56) References Cited

U.S. PATENT DOCUMENTS 7,907,891 B2* 3/2011 Proctor, Jr. ........ H04B 7/15585
455/284
10,383,147 B2* 8/2019 Rajagopal ......... H04W 74/0816
(Continued)

FOREIGN PATENT DOCUMENTS

EP 3905770 A1 11/2021
WO WO 2017/135998 A1 8/2017
(Continued)

OTHER PUBLICATIONS

Office Action for Finland Application No. 20206138 dated Jun. 15, 2021, 7 pages.
(Continued)

*Primary Examiner* — Khaled M Kassim
*Assistant Examiner* — Christopher A. Reyes
(74) *Attorney, Agent, or Firm* — Lippes Mathias LLP

(57) ABSTRACT

To take into account a possible collision during sidelink communications, a transmitter (transceiver) may request one or more other apparatuses (transceivers, receivers) to monitor and report transmissions on sidelink resources at least during a resource received and used by the transmitter for transmission of the data. When one or more monitoring reports are received it is determined whether to reschedule the transmission of the data.

20 Claims, 4 Drawing Sheets

(56) References Cited

U.S. PATENT DOCUMENTS

| | | | | |
|---|---|---|---|---|
| 10,638,506 | B2* | 4/2020 | Faurie | H04W 72/04 |
| 2006/0240769 | A1* | 10/2006 | Proctor, Jr. | H04B 7/15585 |
| | | | | 455/24 |
| 2016/0095092 | A1* | 3/2016 | Khoryaev | H04W 8/005 |
| | | | | 370/329 |
| 2018/0035329 | A1* | 2/2018 | Futaki | H04W 72/0453 |
| 2018/0035430 | A1* | 2/2018 | Futaki | H04W 72/23 |
| 2018/0049259 | A1* | 2/2018 | Aminaka | H04W 76/14 |
| 2018/0049260 | A1* | 2/2018 | Aminaka | H04W 76/14 |
| 2018/0115873 | A1* | 4/2018 | Aminaka | H04W 8/005 |
| 2019/0254059 | A1* | 8/2019 | Gulati | H04W 72/542 |
| 2020/0029340 | A1* | 1/2020 | He | H04W 72/25 |
| 2020/0196279 | A1* | 6/2020 | Thomas | H04W 74/002 |
| 2020/0267729 | A1* | 8/2020 | Kim | H04W 72/20 |
| 2020/0275458 | A1* | 8/2020 | Khoryaev | H04W 72/25 |
| 2020/0288453 | A1* | 9/2020 | Zhang | H04W 72/12 |
| 2020/0351964 | A1* | 11/2020 | Wu | H04W 72/20 |
| 2021/0314112 | A1* | 10/2021 | Balasubramanian | |
| | | | | H04L 5/0076 |
| 2021/0400663 | A1* | 12/2021 | Lee | H04W 4/40 |
| 2022/0061026 | A1* | 2/2022 | Uchiyama | H04W 72/0446 |
| 2022/0295305 | A1* | 9/2022 | Hwang | H04B 7/06 |
| 2022/0322359 | A1* | 10/2022 | Ye | H04W 72/563 |
| 2022/0408413 | A1* | 12/2022 | Tang | H04W 16/06 |
| 2023/0098973 | A1* | 3/2023 | Yang | H04W 72/30 |
| | | | | 370/312 |
| 2023/0131862 | A1* | 4/2023 | Xue | H04W 76/14 |
| | | | | 370/329 |
| 2023/0189081 | A1* | 6/2023 | Miao | H04W 72/0446 |
| | | | | 370/329 |
| 2023/0328760 | A1* | 10/2023 | Yang | H04W 4/40 |
| | | | | 370/329 |
| 2023/0397230 | A1* | 12/2023 | Yu | H04L 1/1861 |
| 2024/0008056 | A1* | 1/2024 | Buthler | H04W 24/10 |
| 2024/0023069 | A1* | 1/2024 | Hu | H04W 72/02 |

FOREIGN PATENT DOCUMENTS

| | | | |
|---|---|---|---|
| WO | WO 2019/193100 | A1 | 10/2019 |
| WO | WO 2020/033526 | A1 | 2/2020 |
| WO | WO 2020/080914 | A1 | 4/2020 |
| WO | WO 2020/102410 | A1 | 5/2020 |
| WO | WO 2020/137130 | A1 | 7/2020 |

OTHER PUBLICATIONS

"3rd Generation Partnership Project; Technical Specification Group Radio Access Network; NR; Medium Access Control (MAC) protocol specification (Release 16)", 3GPP TS 38.321 v16.1.0, (Jul. 2020), 151 pages.

"3rd Generation Partnership Project; Technical Specification Group Radio Access Network; NR; Physical layer procedures for data (Release 16)", 3GPP TS 38.214 v16.2.0, (Jun. 2020), 163 pages.

Bonjorn et al., "Enhanced 5G V2X Services Using Sidelink Device-to-device Communications", 17th Annual Mediterranean Ad Hoc Networking Workshop, (Jun. 2018), 8 pages.

Extended European Search Report for European Application No. 21891294.7 dated Feb. 20, 2024, 12 pages.

International Search Report and Written Opinion for Patent Cooperation Treaty Application No. PCT/FI2021/050737 dated Jan. 21, 2022, 20 pages.

Lien et al., "3GPP NR Sidelink Transmissions Toward 5G V2X", IEEE Access, vol. 8, (Feb. 28, 2020), 15 pages.

Nokia et al., "Network Based Monitoring and Reporting of QoS parameters for NR V2X Sidelink", 3GPP TSG-RAN WG2 Meeting #107bis, R2-1913150, (Oct. 14-18, 2019), 4 pages.

Office Action for Finland Application No. 20206138 dated Jan. 26, 2022, 6 pages.

* cited by examiner

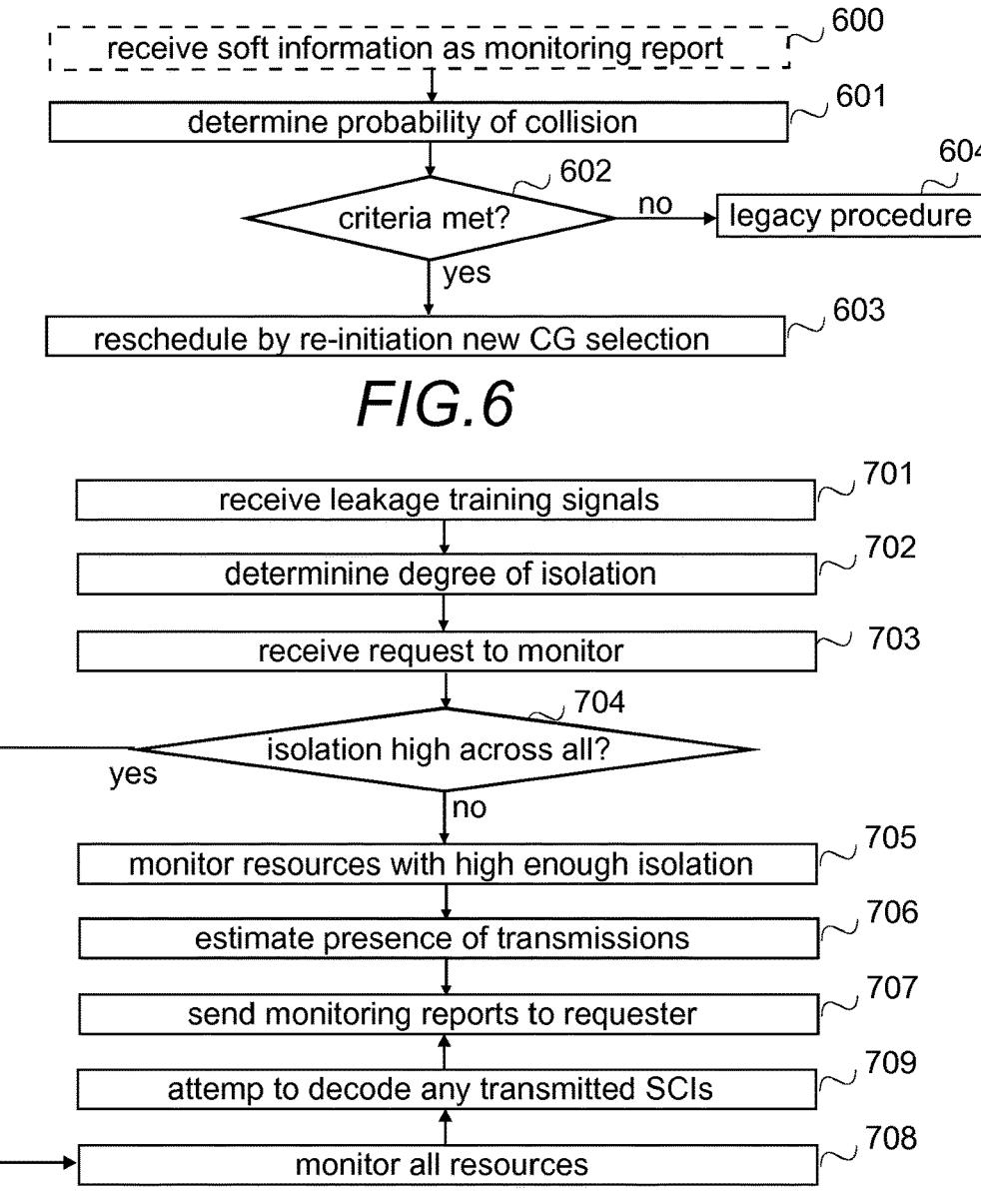

receive soft information as monitoring report ~600 determine probability of collision ~601 criteria met? ~602 no → legacy procedure ~604 yes reschedule by re-initiation new CG selection ~603

*FIG.6* receive leakage training signals ~701 determinine degree of isolation ~702 receive request to monitor ~703 isolation high across all? ~704 yes no monitor resources with high enough isolation ~705 estimate presence of transmissions ~706 send monitoring reports to requester ~707 attemp to decode any transmitted SCIs ~709 monitor all resources ~708

*FIG.7*

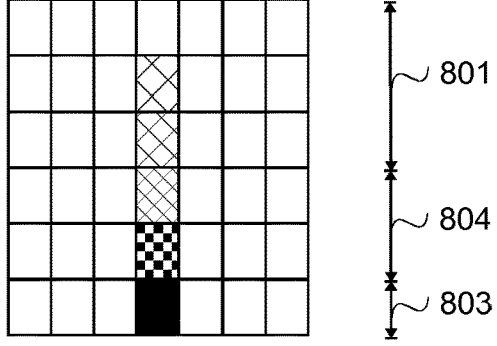

SIDELINK RESOURCE RESELECTION

CROSS-REFERENCE TO RELATED APPLICATIONS

This application is a national phase entry of International Application No. PCT/FI2021/050737, filed Oct. 29, 2021, which claims priority to Finnish Application No. 20206138, filed Nov. 11, 2020, the contents of which are hereby incorporated by reference in their entirety.

TECHNICAL FIELD

Various example embodiments relate to wireless communications and, particularly, to sidelink transmissions.

BACKGROUND

Wireless communication systems are under constant development. For example, devices and sensors may communicate with each other using sidelink communications, without the communications passing via a base station. When devices use the sidelink outside coverage area of a cell, there is no base station assigning resources for transmission, and a transmitting device selects a resource from a pool of resources, which may lead to collisions of transmissions.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided an apparatus comprising at least one first transceiver; at least one processor; and at least one memory including computer program code, the at least one memory and computer program code configured to, with the at least one processor, cause the apparatus at least to perform: selecting, in response to data to be transmitted via a first transceiver, a resource for transmission of the data from a resource pool for sidelink communications; requesting, by the first transceiver, at least one second apparatus to monitor and report transmissions at least during the resource; transmitting, by the first transceiver, the data using the resource; determining, based at least on one or more monitoring reports received from the at least one second apparatus, whether to reschedule the transmission of the data.

In an embodiment, the at least one memory and computer program code are configured to, with the at least one processor, cause the apparatus further to perform, in response to the monitoring report comprising sidelink control information: determining, in response to the sidelink control information indicating a data transmission scheduled to the apparatus that will occur again, a new set of resources in the set of resource pools, which are usable for transmitting the data, the new set being determined using at least the sidelink control information received; checking, whether the new set of resources comprises resources suitable for transmitting the data; and performing, in response to the new set of resources comprising one or more suitable resources, rescheduling by selecting a new resource for transmission of the data from the one or more suitable resources.

In an embodiment, the at least one memory and computer program code are configured to, with the at least one processor, cause the apparatus further to perform, in response to the monitoring report comprising information indicating a probability of a collision of the data transmitted and a data transmission to the apparatus: determining, using at least the information, a probability of the collision; and performing, in response to the probability meeting preset criteria, rescheduling the transmission of the data by re-initiating selecting the resource.

In an embodiment, the at least one memory and computer program code are configured to, with the at least one processor, cause the apparatus further to perform, when the information includes one or more values of signal received power, the determining the probability of the collision either by comparing the one or more values received to a preset threshold, a value not exceeding the threshold indicating that no collision occurred or by comparing the one or more values received to values the first transceiver has measured before selecting the resource, a similar value indicating that no collision occurred.

In an embodiment, the preset criteria comprises quality of service related criteria, and the at least one memory and computer program code are configured to, with the at least one processor, cause the apparatus further to perform using quality of service information relating to the data to be transmitted when determining whether to whether to reschedule the transmission of the data.

In an embodiment, the at least one memory and computer program code are configured to, with the at least one processor, cause the apparatus further to perform, in response to the monitoring report comprising information comprising a flag indicating a collision of the data transmitted and a data transmission to the apparatus using quality of service information relating to the data to be transmitted to determine whether to reschedule the transmission of the data.

In an embodiment, the quality of service information comprises one or more of criticality, latency and periodicity of configured grant.

In an embodiment, the apparatus further comprises at least one second transceiver, wherein the at least one memory and computer program code are configured to, with the at least one processor, cause the apparatus further to perform: requesting, by the first transceiver, at least one of the at least one second transceiver, as at least one of the at least one second apparatus, to monitor and report transmissions at least during the resource; monitoring, by a second transceiver, in response to receiving from the first transceiver a request to monitor and report transmissions, resources for sidelink communications; and causing sending monitoring reports to the first transceiver.

In an embodiment, the at least one memory and computer program code are configured to, with the at least one processor, cause the apparatus further to perform: determining, in response to receiving from the first transceiver leakage training signals, degrees of isolation between the first transceiver and the second transceiver on corresponding frequencies; and using the degrees of isolation to determine which of the resources to monitor and whether to send in the monitoring report sidelink control information or information indicating a probability of a collision.

According to an aspect there is provided an apparatus comprising at least one second transceiver; at least one processor; and at least one memory including computer program code, the at least one memory and computer program code configured to, with the at least one processor, cause the apparatus at least to perform: monitoring, by a second transceiver, in response to receiving from a first apparatus a request to monitor and report transmissions, resources for sidelink communications; and causing sending monitoring reports to the first apparatus.

In an embodiment, the at least one memory and computer program code are configured to, with the at least one processor, cause the apparatus further to perform: determining, in response to receiving from the first apparatus leakage training signals, degrees of isolation between the first apparatus and the second transceiver on corresponding frequencies; and using the degrees of isolation to determine which of the requested resources to monitor and whether to send in the monitoring reports sidelink control information or information indicating a probability of a collision.

According to an aspect there is provided an apparatus comprising at least one transmitter; at least one receiver; at least one processor; and at least one memory including computer program code, the at least one memory and computer program code configured to, with the at least one processor, cause the apparatus at least to perform: selecting, in response to data to be transmitted via a first transmitter to a recipient, a resource for transmission of the data from a resource pool for sidelink communications; requesting at least one of the at least one receiver to monitor and report transmissions at least during the resource; transmitting, by the first transmitter, the data to the recipient using the resource; monitoring, by the at least one of the at least one receiver, resources for sidelink communications at least during the resource; and determining, based on at least monitoring results, whether to reschedule the transmission of the data.

According to an aspect there is provided a system comprising: at least two apparatuses comprising at least one processor and at least one memory including computer program code and configured to communicate with each other using at least sidelink communications, wherein at least one of the at least two apparatuses is configured to be transmitting apparatus and at least one of the at least two apparatuses is configured to be a monitoring apparatus; wherein the at least one memory and computer program code are configured to, with the at least one processor in the transmitting apparatus cause the apparatus to perform at least: selecting, in response to data to be transmitted, a resource for transmission of the data from a resource pool for sidelink communications; requesting, at least one monitoring apparatus to monitor and report transmissions at least during the resource; transmitting the data using sidelink communications; and determining, based at least on one or more monitoring reports received from the at least one second transceiver, whether to reschedule the transmission of the data; wherein the at least one memory and computer program code are configured to, with the at least one processor in the monitoring apparatus cause the apparatus to perform at least: monitoring, in response to receiving from the transmitting apparatus a request to monitor and report transmissions, resources for sidelink communications at least during the resource; and causing sending monitoring reports to the transmitting apparatus.

According to an aspect there is provided an apparatus comprising: means for selecting, in response to data to be transmitted, a resource for transmission of the data from a resource pool for sidelink communications; means for requesting at least one second apparatus to monitor and report transmissions at least during the resource; means for transmitting the data using the resource; means for receiving monitoring reports; and means for determining, based at least on the monitoring reports, whether to reschedule the transmission of the data.

According to an aspect there is provided an apparatus comprising: means for receiving from an entity a request to monitor and report transmissions that use sidelink communications; means for monitoring resources in the sidelink communications; and means for sending monitoring reports to the entity.

According to an aspect there is provided a system comprising: means for selecting, in response to data to be transmitted via a transceiver to a recipient, a resource for transmission of the data from a resource pool for sidelink communications; means for requesting at least one receiver to monitor and report transmissions at least during the resource; means for transmitting, via the transceiver, the data to the recipient using the resource; means for monitoring, via the at least one receiver, resources for the sidelink communications at least during the resource; means for receiving monitoring reports; and means for determining, based at least on the monitoring reports, whether to reschedule the transmission of the data.

According to an aspect there is provided a method comprising: selecting, in response to data to be transmitted via a first transceiver, a resource for transmission of the data from a resource pool for sidelink communications; requesting, by the first transceiver, at least one apparatus to monitor and report transmissions at least during the resource; transmitting, by the first transceiver, the data using the resource; determining, based at least on one or more monitoring reports received from the at least one apparatus, whether to reschedule the transmission of the data.

According to an aspect there is provided a method comprising: receiving from an entity a request to monitor and report transmissions that use sidelink communications; monitoring resources for sidelink communications; and causing sending monitoring reports to the entity.

According to an aspect there is provided a method comprising: selecting, in response to data to be transmitted via a transceiver to a recipient, a resource for transmission of the data from a resource pool for sidelink communications; requesting at least one receiver to monitor and report transmissions at least during the resource; transmitting, via the transceiver, the data to the recipient using the resource; monitoring, via the at least one receiver, resources for the sidelink communications at least during the resource; receiving monitoring reports; and determining, based at least on the monitoring reports, whether to reschedule the transmission of the data.

According to an aspect there is provided a computer program comprising instructions for causing an apparatus to perform at least the following: selecting, in response to data to be transmitted via a first transceiver, a resource for transmission of the data from a resource pool for sidelink communications; requesting at least one apparatus to monitor and report transmissions at least during the resource; causing transmitting the data using the resource; determining, based at least on one or more monitoring reports received from the at least one apparatus, whether to reschedule the transmission of the data.

According to an aspect there is provided a computer program comprising instructions for causing an apparatus to perform at least the following: monitoring, in response to receiving a request to monitor and report transmissions, resources for sidelink communications; and causing sending monitoring reports.

According to an aspect there is provided a computer readable medium comprising program instructions for causing an apparatus to perform at least the following: selecting, in response to data to be transmitted via a first transceiver, a resource for transmission of the data from a resource pool for sidelink communications; requesting at least one apparatus to monitor and report transmissions at least during the resource; causing transmitting the data using the resource; determining, based at least on one or more monitoring reports received from the at least one apparatus, whether to reschedule the transmission of the data.

According to an aspect there is provided a computer readable medium comprising program instructions for causing an apparatus to perform at least the following: monitoring, in response to receiving a request to monitor and report transmissions, resources for sidelink communications; and causing sending monitoring reports.

According to an aspect there is provided a non-transitory computer readable medium comprising program instructions for causing an apparatus to perform at least the following: selecting, in response to data to be transmitted via a first transceiver, a resource for transmission of the data from a resource pool for sidelink communications; requesting at least one apparatus to monitor and report transmissions at least during the resource; causing transmitting the data using the resource; determining, based at least on one or more monitoring reports received from the at least one apparatus, whether to reschedule the transmission of the data.

According to an aspect there is provided a non-transitory computer readable medium comprising program instructions for causing an apparatus to perform at least the following: monitoring, in response to receiving a request to monitor and report transmissions, resources for sidelink communications; and causing sending monitoring reports.

BRIEF DESCRIPTION OF DRAWINGS

Embodiments are described below, by way of example only, with reference to the accompanying drawings, in which

FIGS. 3 to 7 illustrate example functionalities;

FIG. 8 illustrates an example of degrees of isolation in a resource pool;

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
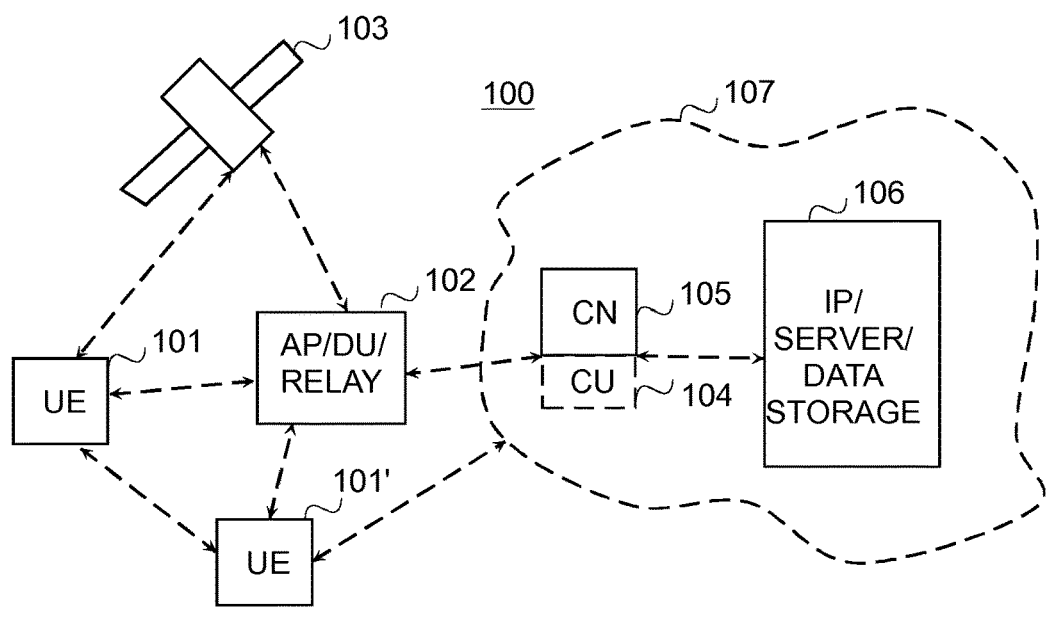
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H (e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Sidelink transmissions, i.e. user devices communication directly with each other, without involving radio access network in the actual data transmission, are used, for example, for public safety and vehicle-to-everything (V2X) services. The vehicle-to-everything services includes vehicle-to-vehicle (V2V), vehicle-to-pedestrian (V2P), and vehicle-to-infrastructure (V2I), for example.

Figure 2:
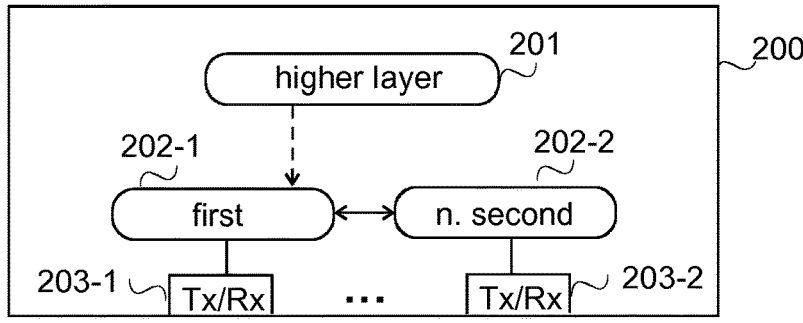
FIG. 2 is a schematic block diagram.

FIG. 2 illustrates one example of a user device configured to support sidelink transmissions and to schedule the resources for sidelink resources. In the illustrated example the transceivers locate within the user device, which may be a vehicular device, like a car. In the example illustrated in FIG. 2, there are separate transceivers which may be used in parallel for reception and transmission, without limiting solutions to such a structure. For example, there may be separate transmitters and/or receivers, and the transmitters/ transceivers/receivers may be distributed to a plurality of user devices, like sensor nodes.

Referring to FIG. 2, the user device 200 illustrated in the example comprises two or more independent transceivers (Tx/Rx) 203-1, 203-2. One or more of the transceivers 203-1, 203-2 may be configured to support new radio communication technology, for example, and one or more may be configured to support one or more different communication technologies, such as Bluetooth or wireless local area network technology, for example based on IEEE 802 standard family. When there is data to be transmitted, a higher layer entity 201, for example an application layer entity, having independent access to the transceiver entities 202-1, 202-2, requests (a dotted line with an arrow head in FIG. 2) one of the transceiver entities to transmit the data. The transceiver entity receiving the request is called herein a first entity 202-1 and the other transceiver entities are called second entities 202-2. When the first entity 202-1 receives the request to transmit, and the first entity 202-1 operates in a mode in which the first entity reserves resources for the transmission, the first entity requests (a solid line with two arrow heads) one or more second entities 202-2 to monitor the band and report back, as will be described below.

It should be appreciated that even though in the example of FIG. 2 the transceiver chain 203-1 to 203-2 of separate transceivers share the same higher layer resources (higher layer hardware resources), they could have their own higher layer resources. The below disclosed examples are implementable also for different hardware setups and also when one or more of the transceivers in the transceiver chains locate in separate interconnected devices. Further, it should be appreciated that a transceiver may be replaced by a transmitter and/or a receiver, and a transmitter part of a transceiver may be treated as a separate part of a receiver part of the transceiver, meaning that the transceiver part may request the receiver part to monitor. However, for the sake of clarity, a transceiver is used herein to cover all possibilities.

Figure 3:
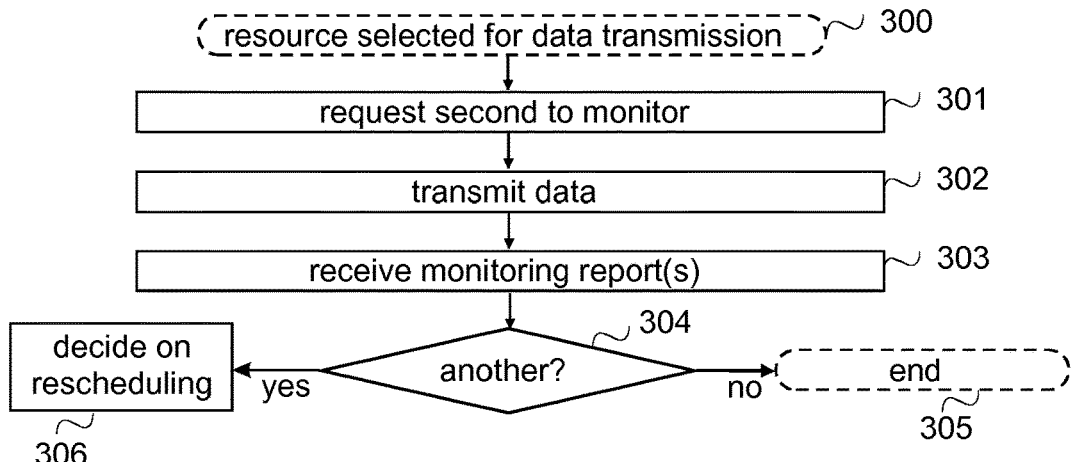

Referring to FIG. 3, when the first transceiver (a combination of the first entity and its transceiver) has received from the higher layer a request to transmit data, and has selected the resource for the data transmission (block 300), the first transceiver sends in block 301 to one or more second transceivers a request to monitor transmissions. The request to monitor may be broadcast inside the user device comprising the first transceiver and the one or more second transceivers, or the first transceiver may send the request second transceiver—specifically in a point-to-point fashion, or point-to-multipoint transmissions from the first transceiver to the one or more second transceivers may be used. The request may indicate a selected transmission window, which is the time period within which the transmission is selected to take place. In an implementation, also information on a band to monitor may sent in the request. Then the first transceiver transmits in block 302 the data in the selected resource (time slot-frequency). After the transmission window has expired, one or more monitoring reports (monitoring results) are received in block 303 from the one or more second transceivers. If the monitoring report(s) indicate that no other user device transmitted data (block 304: no), no collision occurred and the data transmission process end (block 305).

If the monitoring report(s) indicate that another user device transmitted data (block 304: yes) to the user device comprising the first transceiver, the first transceiver decides in block 305 on rescheduling the transmission. The data transmitted to the user device comprising the first transceiver may be addressed to the user device.

Figure 4:
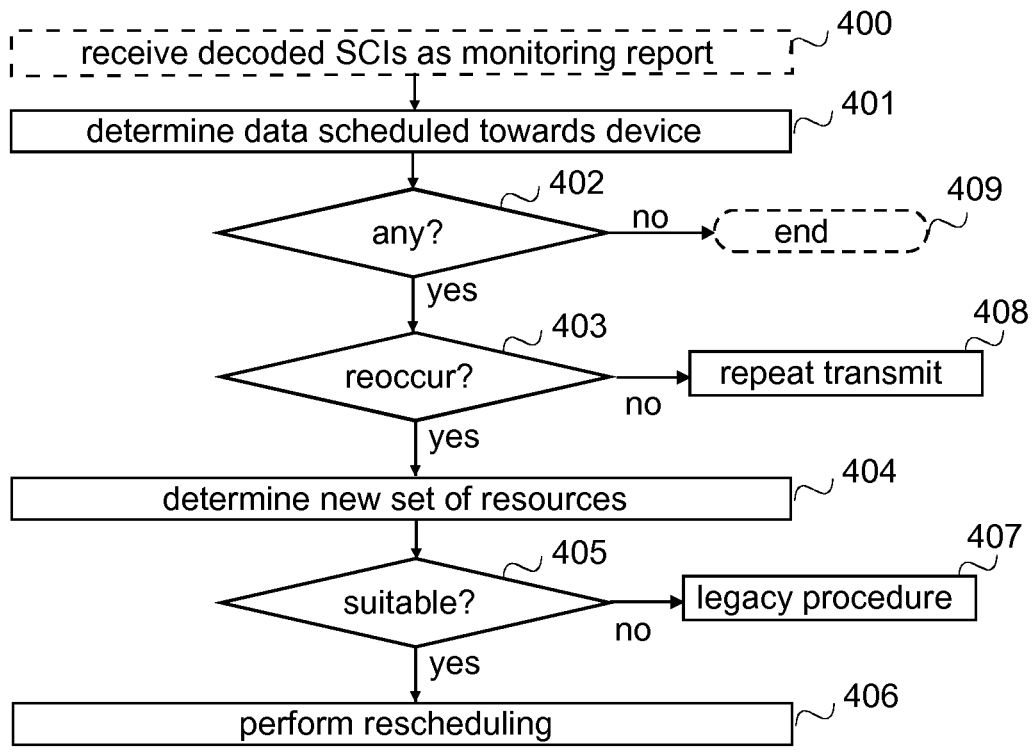
Figure 5:
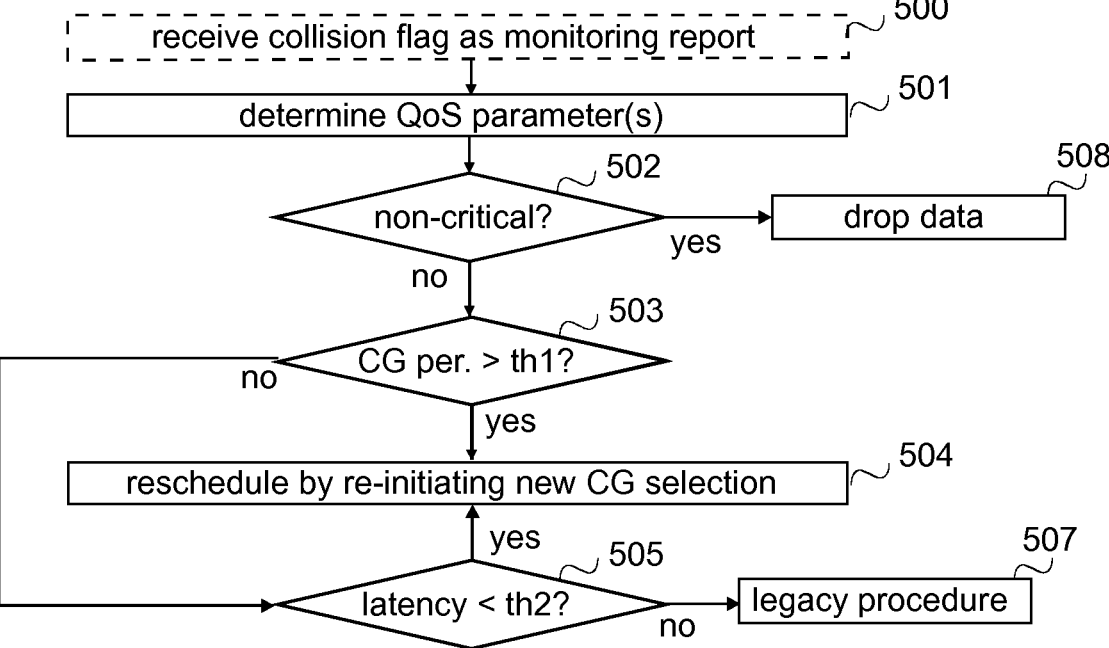

FIGS. 4 to 6 illustrate different decisions, depending on the monitoring report(s) received. Further, in the examples illustrated in FIGS. 4 to 6, it is assumed that the first transceiver has reserved a configured grant resource for the data transmission.

FIG. 4 illustrates a solution in which a received monitoring report comprises one or more pieces of decoded sidelink control information (SCIs). The sidelink control information provides information on allocated resources. Since sidelink control information is publicly available, the information can be used and transmitted without data encryption and hence without security context sharing. In the illustrated example it is assumed, for the sake of completeness, that a report is received even in case no other data transmission took place. However, it should be appreciated that other solutions are possible. For example, the monitoring device may be configured not to send a monitoring report if there is no data transmission at all, or there is no data transmission scheduled towards the user device comprising the first transceiver, and the user device is configured in such cases to determine that no collision happened. The "no monitoring report" may also be indicated by one or more bits denoting "no report available", followed by any potential data, for example.

If one or more monitoring reports is received (block 400), it is determined in block 401, based on the sidelink control information, whether the sidelink control information indicates any data (data transmission) scheduled towards the first transceiver (i.e. to the user device comprising the first transceiver). If there was at least one data transmission (block 402: yes) scheduled towards the first transceiver, periodicity information in the sidelink control information is used in block 403 to determine, whether the data transmission will reoccur. In other words, a collision has been detected in block 402 and it is checked in block 403, whether the collision will occur again. In the illustrated example it is assumed that if the sidelink control information indicates that the resource for the data transmission to the first transceiver is a configured grant resource, the data transmission (and collision) will reoccur in the same selected resource. However, in case the resource for the data transmission to the first transceiver is a dynamic grant, it will not reoccur.

If the data transmission will reoccur (block 403: yes), the first transceiver determines in block 404, using the sidelink control information received, a new set of resources for its data transmission. Then the first transceiver checks, in block 405, whether any of the resources in the new set is suitable. The suitability may be determined using the same procedure that is used when resources for the data transmission are selected first time/previous time. For example, legacy procedures and thresholds can be used (legacy meaning solutions known at the time of filing this application). A free resource, i.e. a resource not indicated to be used by other devices, is a suitable resource, and if no free resource is available, a resource with an interference level, which is better, or at most slightly worser than an interference level with the resource over which the collision occurred. During this checking, information the first transceiver obtained during a sensing period preceding the selection of the resources in the first time/previous time may be combined with the monitoring report. By combining the own results with results from other transceivers, a better overview of the resource usage within the resource pool may be obtained.

If one or more suitable resources are found (block 405: yes), the first transceiver performs in block 406 rescheduling of the data transmission using the suitable resources. In other words, a new configured grant resource is selected for the data transmission.

If no suitable resources are found (block 405: no), the first transceiver performs in block 407 a legacy procedure. Depending on the implementation, the legacy procedure may be retrying the transmission until a radio failure is detected, or the legacy procedure may be based on a solution in which the resource selection will converge towards a solution where no resources collide. In such a solution a resource is randomly selected from a sub-pool of x best resourced the first transceiver detected during the sensing, and this resource is maintained for a time period controlled by a reselection counter, which may be adjustable or randomly set. In other words, during legacy procedure, the first transceiver may wait for a time z until a resource selection expires, and then may perform a reselection.

If the data transmission will not reoccur (block 403: no), in the illustrated example the data transmission is repeated in block 408 next time using the previously selected resource.

If there was no data transmission (block 402: no) scheduled towards the first transceiver, in the example it is assumed that no collision happened and the process ends (block 409).

In the illustrated example, even though a monitoring report may sometimes contain a partial sidelink control information, i.e. the sidelink control information does not contain information on all possible other user devices, for example due to other usage of the receiver (monitoring transceiver), this does not matter, since the rescheduling in block 406 is performed using the suitable resources. For example, if there is only one indication that a collision occurred, decision to reschedule will be determined based on the one indication.

As can be seen from the above, the process described in FIG. 4 uses the knowledge received during monitoring to detect collisions and to resolve them, thereby allowing immediate rescheduling (if suitable resources are available), decreasing the delay of the sidelink transmission from the first transceiver and the delay of the sidelink reception to the first transceiver.

FIG. 5 illustrates a solution in which a received monitoring report is a flag indicating whether a collision occurred. In the illustrated example it is assumed that a monitoring report with a collision flag (i.e. a flag indicating that collision occurred) is received. The use of a flag provides a simple procedure for a second transceiver to indicate a possible collision. Depending on an implementation, the flag may be transmitted with encryption or without encryption. Below it is assumed, for the sake of clarity, that the flag is transmitted without encryption.

Referring to FIG. 5, when a collision flag is received as a monitoring report (block 500), the priority transceiver will determine in block 501 one or more quality of service (QoS) parameters, using internally available quality of service information. In the illustrated example, three parameters are determined, just for the sake of illustration. In other examples, one parameter, two parameters or more than three parameters may be defined, and the parameters may be different from what is disclosed in the example of FIG. 5. In the illustrated example in block 501 it is determined, whether the data to be transmitted is critical or noncritical, required latency of the data to be transmitted and a configuration grant (CG) periodicity.

If the data is not non-critical (block 502: no) and the configuration grant periodicity (CG per.) is above a first threshold (th1) (block 503: yes), the first transceiver reschedules in block 504 the data transmission by re-initiating a new configuration grant selection (including sensing). In other words, the sensing procedure is performed again for the data, as if the data were a new data. The value of the first threshold may be adjustable, depending for example on usage of the user device. In the illustrated example it is assumed that reinitiating the sensing procedure and selection of transmission resource is a faster procedure than the legacy procedure.

If the data is not non-critical (block 502: no) but the configuration grant periodicity (CG per.) is not above the first threshold (block 503: no), it is checked in block 505, whether the required latency is below a second threshold (th2). The value of the second threshold may be adjustable, depending for example on usage of the user.

If the required latency is not below the second threshold (block 505: no), the first transceiver performs in block 506 a legacy procedure. Examples of legacy procedure are described above with block 407. In other words, in the example it is assumed, that if the required latency is high enough, there is in principle no incentive to reschedule.

If the required latency is below the second threshold (block 505: yes), the first transceiver proceeds to block 505 to re-initiate a new configuration grant selection.

In the illustrated example, if the priority is low (block 502: yes), the first transceiver drops in block 508 the data to be transmitted.

As can be seen from the above example, collision aware decision relating to resource selection can be performed using a flag and internal information.

FIG. 6 illustrates a solution in which a received monitoring report is soft information (soft indicator) indicating a probability of a collision. In the illustrated example, reference signal received power is used as the soft information without limiting the example to such a soft information. Depending on an implementation, the soft information may be transmitted with encryption or without encryption. Below it is assumed, for the sake of clarity, that the soft information is transmitted without encryption.

Referring to FIG. 6, when soft information, for example one or more values of reference signal received power, is received (block 600), the first transceiver determines in block 601, using the soft information, a probability of a collision. The probability of the collision may be determined by comparing the value of the reference signal received power (the value being an estimate) to a threshold: if the value of the reference signal received power is high (higher than a preset threshold), there is a high probability of a collision. Correspondingly, if the value of the reference signal received power is low (lower than a preset threshold), there is a low probability of a collision, i.e. the transmission is most probably targeted to another user device. In another implementation, the determining is performed by comparing the received value with a value measured by the first transceiver during the sensing period before the transmission resource was selected (and no collision or an acceptable collision was detected). In the implementation, if the values are similar, it is probably that no collision has occurred. Correspondingly, if the values are different, then it is probably that a collision has occurred.

Using the probability of the collision and other criteria, the first transceiver checks in block 602, whether there is a need for rescheduling. In other words, it is check, whether criteria for rescheduling is met.

In an implementation, the criteria is met, when the probability is that a collision occurred, the priority of the data to be transmitted is not low, and the configured grant periodicity is above threshold. In other words, in the implementation, the criteria used in addition to the probability, is the same as with the process described with FIG. 5.

In another implementation, if the probability of the collision is above a threshold, the criteria is met.

The probability value and the criteria, including the threshold used, may vary from a user device to a user device, and/or on the deployment environment and/or a specific situation. For example, a probability value may be high if there is one or more other user devices within a short range, but the short range criteria depends on circumstances: between cars the short range may be several tens of meters, whereas the short range between user devices carried by pedestrians may be few meters or less.

Assuming a system, in which a device is in a fixed group with known communication, i.e. for platooning with fixed communication patterns set up with other devices in the fixed group, and where the main unknown communication ongoing in the sidelink will be for devices not to collide. As soon as "unknown data transmission", i.e. a decodable signal power is noticed (detected, sensed), a probability of high priority data incoming from other devices (devices outside the fixed group) is high; the signal originates most probably from another platoon/vehicle approaching. To determine, whether the criteria is met, purpose of the internal transmissions scheduled is compared with the assumed purpose of the expected external communication, the latter being "to avoid devices to collide". If the internal data is known to be some kind of leisure data, then the "unknown data transmission" may be prioritized, and the criteria is no met in block 602. However, the criteria in block 602 may be met, when the "unknown data transmissions" occurs the first time and/or with just barely signal power enough to decode and/or the known platoon data avoids an internal collision.

Likewise, if a signal that probably may have collided is detected, with a low power, a first time, the criteria in block 602 may have been met, whereas if the signal is detected a second time with a higher power, the criteria in block 602 may have not been met. In such a case the signal may be from a vehicle approaching, whereas it otherwise may be a vehicle leaving, especially in case a decodable signal is seen with less power.

In a still another implementation, the soft information is used to determine amount of valid resources to indicate congestion in the sidelink channel. For example, if the soft information comprises several samples in time, it may indicate congestion. In the implementation, the criteria is met, when the probability is that a collision occurred and there are one or more resources indicated to be less congested than the used one.

In further implementations two or more of the above implementations are combined to check in block 602, whether the criteria is met.

If the criteria for rescheduling is met (block 602: yes), then the first transceiver reschedules in block 603 the data transmission by re-initiating a new configuration grant selection. In other words, the sensing procedure is performed again for the data, as if the data were a new data.

If the criteria for rescheduling is not met (block 602: no) then a legacy procedure is performed in block 604. Examples of legacy procedure are described above with block 407.

The soft information enables that the first transceiver is able to determine whether a collision has probably happened.

FIG. 7 illustrates a functionality of a second transceiver (a combination of a second entity and its transceiver). In the illustrated example, it is assumed that the second transceiver is configured to determine a level of self-interference (a degree of isolation), and to use the information to determine the content type of the monitoring report. The level of self-interference, also called leakage training, may be performed once and used thereafter, or it may be performed periodically or continuously, depending on an implementation.

Referring to FIG. 7, the second transceiver receives in block 701 from the first transceiver leakage training signals, i.e. a preset (known) signal sequence with preset (known) power in narrow band chunks of a resource pool (a set of resources assigned to sidelink transmissions). The size of the narrow band chunks may be the same as the size of a minimum resource allocation in the resource pool. However, to minimize an impact of the leakage training, the size of the narrow band chunk may be a size of a group of two or more minimum resource allocations in the resource pool.

The second transceiver determines in block 702 a degree of the isolation by measuring the received leakage training signals, calculating, using measurement results, corresponding reference signal received power values for the narrow band chunks, and then use the values to evaluate a degree of isolation between the second transceiver and the first transceiver.

FIG. 8 depicts an example of degrees of isolation in a resource pool. The amount of black in rectangles indicates the amount of interference (the more black the more interference and the smaller the degree of isolation). Referring to FIG. 8, the resources are divided into three zones 801, 802, 803. In zone 801, the degree of isolation is big enough (interference is low enough) so that sidelink control information can be decoded. In zone 802 the degree of isolation is in a level in which the sidelink control information cannot be successfully decoded but the second transceiver is capable of estimating whether there is a transmission. In zone 803 the degree of isolation is so low (interference is so high) that the second transceiver cannot decode or estimate.

In user devices, in which the transceivers are fully isolated from each other, a transmit power from the first transceiver may not leak into resources that are to be monitored by the second transceiver, and the process of block 701 and 702 may be omitted. The isolation between transceivers in the user device may be accomplished in radio frequency domain by antenna decoupling and in the digital/baseband domain by applying successive interference cancellations.

Returning back to FIG. 7, when the second transceiver receives a request to monitor in block 703 certain resources during a transmission window, it uses the degrees of isolation determined for the resources to check in block 704, whether the degree of isolation is high enough across all resources that are to be monitored. If it is not (block 704: no), in the illustrated example, the second transceiver monitors, during the transmission window, in block 705 resources that have high enough degree of isolation, and estimates, during the transmission window, in block 706 presence of transmissions in the resources. The estimation may be different for different resources to monitor, based on the degree of the isolation. For example, the second transceiver may decode sidelink control information in resources with high enough degree of isolation, and estimate presence of transmission in resources having a degree of isolation allowing it, and not to monitor resources having a low degree of isolation. The presence of transmission may be estimated by comparing a value of reference signal received power with a detection threshold. The threshold may be similar to thresholds described with FIG. 6. The value of the reference signal received power is associated with sidelink control information. The presence of transmission may also be estimated by subtracting from the reference signal received power the measured leakage power of the corresponding resource. Once presence of transmissions are estimated and monitoring time (i.e. the transmission window) has lapsed, the monitoring reports are send in block 707 to the first transceiver.

If the degree of isolation is high enough across all resources that are to be monitored (block 704: yes), the second transceiver monitors, during the transmission window, in block 708 all resources, and attempts in block 709, during the transmission window, to decode any transmitted sidelink control information to be included to monitoring reports. Once monitoring time has lapsed, the monitoring reports are send in block 707 to the first transceiver.

Figure 9:
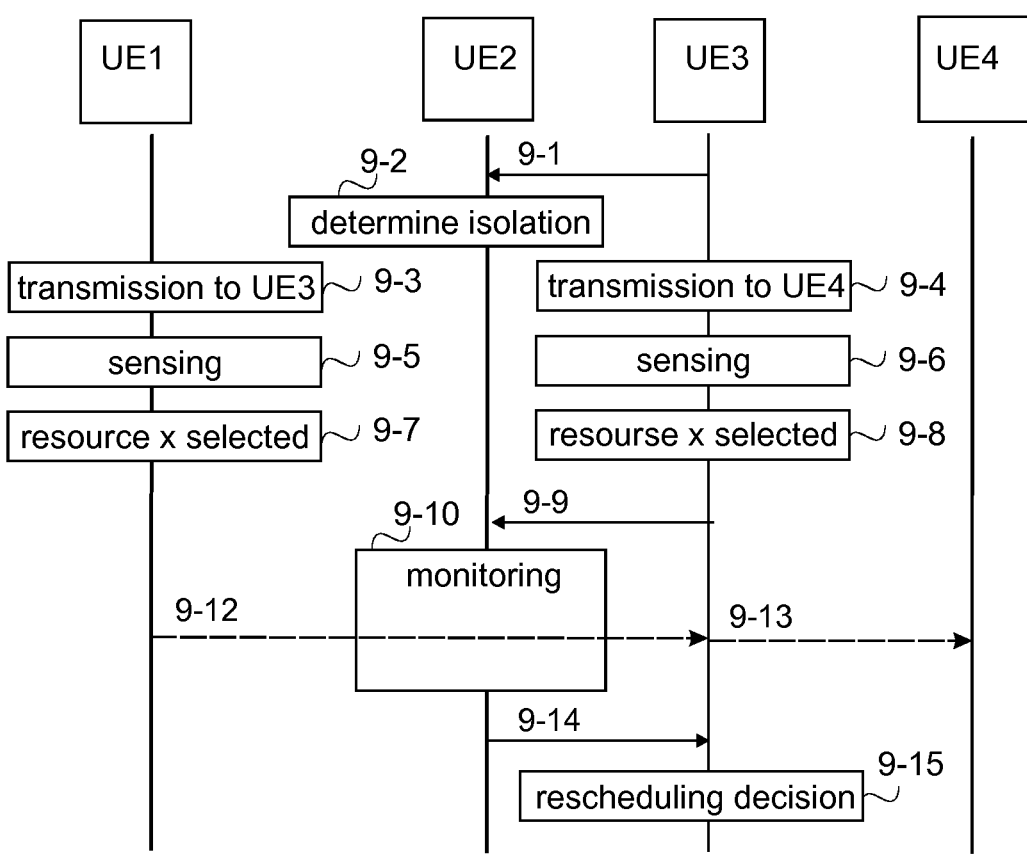
FIG. 9 illustrates an example of information exchange.

FIG. 9 illustrates an example of information exchange in a sidelink when user devices selects the resources to use. The user devices may be out-of cell coverage or in an idle mode, for example. The user devices may use mode 2 resource allocation in sidelink, in which during a sensing window (the same to all user devices) the user devices sense resources deemed to be available for selection for the next period (for transmission). In the illustrated example, a user device UE1 wants to transmit data to a user device UE3, using communication technology a transceiver in the user device UE3 is configured to receive. It should be appreciated that there may be a plurality of user devices wanting to transmit to the user device UE3. Further, the user device UE3 wants to transmit to a user device UE4 data, using the same communication technology the transceiver in the UE3 is configured to transmit. The user devices may be sensors (sensor nodes) in a sensor network. The user devices, or some of them, may also locate within another device, for example UE2 and UE3 may locate in one vehicular device. Further, since there may be a plurality of UE2s (depicted by one UE2 in FIG. 9), one or more UE2s may locate outside the device comprising UE3 and one or more UE2s within the device comprising UE3.

Referring to FIG. 9, a leakage training is performed between UE2 and UE3 by UE3 transmitting multiple narrow band signals 9-1 and UE2 determining in block 9-2 isolation (the degree of isolation of the signals), as explained above with FIG. 7.

Then UE1 receives in block 9-3 from its higher layer data to be transmitted to UE3 using configured grant, and UE3. receives in block 9-4 from its higher layer data to be transmitted to UE4 using configured grant. Then both UE1 and UE3 performs (blocks 9-5, 9-6) sensing procedure to find out resources available in a resource pool for selection. Since both UE1 and UE3 sense that resource x is the best resource available, they both select (blocks 9-7, 9-8) resource x. However, UE1 and UE3 could select different resource from the same resource pool. Further, UE3 sends UE2 a request 9-9 for monitoring, as explained in the above examples. The request for monitoring may also be a request to start sensing a timeslot associated with the resource x (i.e. the resource selected by UE3).

UE2 monitors (block 9-10) the resources, as explained above. While UE2 monitors (senses) the resources, UE1 transmit (message 9-12) the data to UE3, and UE3 transmit (message 9-13) the data to UE4.

UE2 has detected the transmission (message 9-12) from UE1, and sends monitoring report 9-14 to UE3, which then makes in block 9-15 a rescheduling decision, according to any above described examples.

The leakage training (message 9-1), and/or the request (message 9-9) and/or the report(s) (message 9-14 may be internal exchange, and/or signaling sent over air interface, for example PC5 interface for direct communications.

The above examples discloses solutions in which it is the intended receiver (receiving transceiver) that is configured to solve conflicts in resource selection. This may result to a faster way to resolve conflict, which in turn increases reliability, decreases waste of resources used for retransmitting the same data again and again, and lowers latency of sidelink transmissions. Thus, quality of service will be better. Further, a decision whether to perform a reselection (rescheduling) of configured grant resources can be done by exchanging less information than in solutions requiring exchange of a full dataset. In other words, partial information, for example one piece of sidelink control information, and/or one piece of soft information, and/or one flag is sufficient.

It should be appreciated that if monitoring reports are received from multiple transceivers, the first transceiver may collect all the monitoring reports to perform a more reliable collision detection. In an implementation, the first transceiver may be configured to perform the process of FIG. 4, if one or more monitoring reports comprising decoded sidelink control information is received, and if no such report is received, to perform the process of FIG. 6, if one or more monitoring reports comprising the soft information is received, and to perform the process of FIG. 5 if none of the received monitoring reports comprised decoded sidelink control information or the soft information. In another implementation, the first transceiver may be configured to perform the process of FIG. 4, but instead of block 407 and/or block 409 to perform the process of FIG. 6 but instead of block 604 to perform the process of FIG. 5. In a still further implementation, monitoring reports comprising different type of monitoring results are processed in parallel, and if any indicate rescheduling, the rescheduling will be performed. It should be appreciated that the above implementations are mere examples and any other way to process all monitoring results may be used.

Even though in the above the examples are described using transceivers in the same user apparatus, it is a straightforward measure for one skilled in the art to apply the disclosed solutions to sensors in a sensor network by collaboration in which one sensor at a time (or if need be, several times in a row before another sensor) may act as the first transceiver while some of the other sensors are acting as the second transceivers.

The blocks and related functions and information exchange (signaling) described above by means of FIGS. 2 to 9 are in no absolute chronological order, and some of them may be performed simultaneously or in an order differing from the given one. Other functions can also be executed between them or within them and/or other rules applied or selected. Some of the blocks or part of the blocks can also be left out or replaced by a corresponding block or part of the block. Other information exchange may take place, or part of the information exchange may be left out or replaced.

Figure 10:
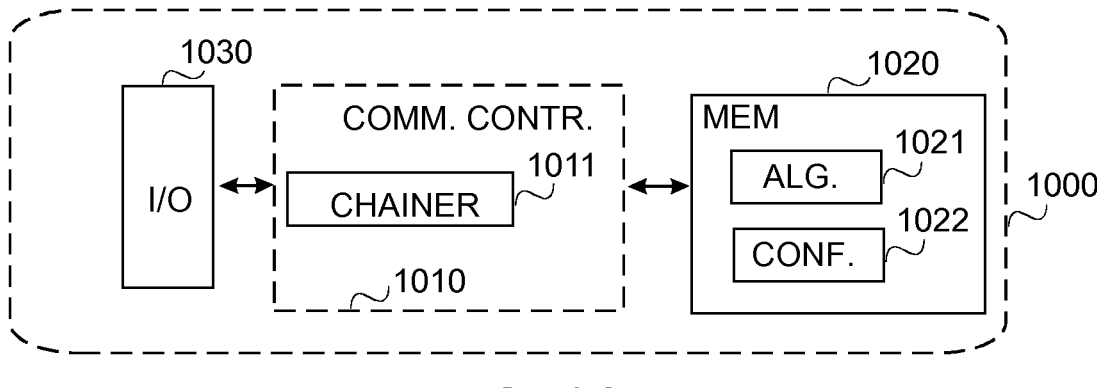
FIG. 10 is a schematic block diagram.

FIG. 10 illustrates an apparatus 1000 comprising a communication controller 1010 such as at least one processor or processing circuitry, and at least one memory 1020 including a computer program code (software, algorithm) ALG. 1021, wherein the at least one memory and the computer program code (software, algorithm) are configured, with the at least one processor, to cause the respective apparatus to carry out any one of the embodiments, examples and implementations described above. The apparatus of FIG. 10 may be an electronic device and/or a vehicular device and/or a sensor node, for example.

Referring to FIG. 10, the memory 1020 may be implemented using any suitable data storage technology, such as semiconductor based memory devices, flash memory, magnetic memory devices and systems, optical memory devices and systems, fixed memory and removable memory. The memory may comprise a configuration storage CONF. 1022, such as a configuration database, for at least storing (permanently or temporarily) one or more configurations and/or corresponding parameters/parameter values, for example the self-isolation results, and/or monitoring related information and/or monitoring reports. The memory 1020 may further store a data buffer for data waiting for transmission and/or data waiting to be decoded.

Referring to FIG. 10, the apparatus 1000 may further comprise a communication interface 1030 comprising hardware and/or software for realizing communication connectivity according to one or more radio communication protocols. The communication interface 1030 may provide the apparatus with radio communication capabilities in a wireless network. The communication interface may comprise standard well-known analog radio components such as an amplifier, filter, frequency-converter and circuitries, conversion circuitries transforming signals between analog and digital domains, and one or more antennas or antenna arrays comprising plurality of antennas. Digital signal processing regarding transmission and/or reception of signals, internally and/or externally, may be performed in a communication controller 1010.

The apparatus 1000 may further comprise an application processor (not illustrated in FIG. 10) executing one or more computer program applications that generate a need to transmit and/or receive data The application processor may execute computer programs forming the primary function of the apparatus.

The communication controller 1010 may comprise one or more chainer mechanism 1011 configured to start a chain of transceivers (or a chain of a transmitter and monitoring receivers/transceivers) by requesting to monitor, or to participate to the chain by monitoring and reporting according to any one of the embodiments/examples/implementations described above.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile device or a similar integrated circuit in a sensor, a cellular network device, or another network device.

In an embodiment, at least some of the processes described in connection with FIGS. 2 to 9 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising
   at least one first transceiver;
   at least one processor; and
   at least one memory storing instructions that, when executed by the at least one processor, cause the apparatus at least to perform:
   selecting, in response to data to be transmitted via a first transceiver, a resource for transmission of the data from a resource pool for sidelink communications;
   requesting, by the first transceiver, at least one second apparatus to monitor and report transmissions at least during the selected resource, wherein the request specifies the selected resource and instructs the at least one second apparatus to obtain sidelink control information or measurements during that resource, the request and reporting being performed directly between apparatuses without base station scheduling;
   transmitting, by the first transceiver, the data using the resource; and
   determining, based at least on one or more monitoring reports received from the at least one second apparatus, whether to reschedule the transmission of the data, wherein the selecting and the rescheduling are performed without base station scheduling,
   wherein determining whether to reschedule comprises comparing the received measurements to values previously measured by the first transceiver before resource selection and the rescheduling determination is further based on periodicity of a configured grant.

2. The apparatus of claim 1, wherein the at least one memory and computer program code configured to, with the at least one processor, cause the apparatus further to perform, in response to the monitoring report comprising sidelink control information:
   determining, in response to the sidelink control information indicating a data transmission scheduled to the apparatus that will occur again, a new set of resources in the set of resource pools, which are usable for transmitting the data, the new set being determined using at least the sidelink control information received;

checking, whether the new set of resources comprises resources suitable for transmitting the data; and performing, in response to the new set of resources comprising one or more suitable resources, rescheduling by selecting a new resource for transmission of the data from the one or more suitable resources.

3. The apparatus of claim 1, wherein the at least one memory and computer program code are configured to, with the at least one processor, cause the apparatus further to perform, in response to the monitoring report comprising information indicating a probability of a collision of the data transmitted and a data transmission to the apparatus:

determining, using at least the information, a probability of the collision; and performing, in response to the probability meeting preset criteria, rescheduling the transmission of the data by re-initiating selecting the resource.

4. The apparatus of claim 3, wherein the at least one memory and computer program code are configured to, with the at least one processor, cause the apparatus further to perform, when the information includes one or more values of signal received power, the determining the probability of the collision either by comparing the one or more values received to a preset threshold, a value not exceeding the threshold indicating that no collision occurred or by comparing the one or more values received to values the first transceiver has measured before selecting the resource, a similar value indicating that no collision occurred.

5. The apparatus of claim 3, wherein the preset criteria comprises quality of service related criteria, and the at least one memory and computer program code are configured to, with the at least one processor, cause the apparatus further to perform using quality of service information relating to the data to be transmitted when determining whether to reschedule the transmission of the data, wherein the quality of service information comprises criticality, latency and periodicity of configured grant.

6. The apparatus of claim 1, wherein the at least one memory and computer program code are configured to, with the at least one processor, cause the apparatus further to perform, in response to the monitoring report comprising information comprising a flag indicating a collision of the data transmitted and a data transmission to the apparatus using quality of service information relating to the data to be transmitted to determine whether to reschedule the transmission of the data.

7. The apparatus of claim 5, further comprising a second transceiver configured to act as the second apparatus, the apparatus being operable to use isolation training signals between the first and second transceivers to select monitoring resources.

8. The apparatus of claim 1, further comprising at least one second transceiver, wherein the at least one memory and computer program code are configured to, with the at least one processor, cause the apparatus further to perform:

requesting, by the first transceiver, at least one of the at least one second transceiver, as at least one of the at least one second apparatus, to monitor and report transmissions at least during the resource;

monitoring, by a second transceiver, in response to receiving from the first transceiver a request to monitor and report transmissions, resources for sidelink communications; and causing sending monitoring reports to the first transceiver.

9. The apparatus of claim 8, wherein the at least one memory and computer program code are configured to, with the at least one processor, cause the apparatus further to perform:

determining, in response to receiving from the first transceiver leakage training signals, degrees of isolation between the first transceiver and the second transceiver on corresponding frequencies; and using the degrees of isolation to determine which of the resources to monitor and whether to send in the monitoring report sidelink control information or information indicating a probability of a collision.

10. A method comprising:

selecting, in response to data to be transmitted via a first transceiver, a resource for transmission of the data from a resource pool for sidelink communications;

requesting, by the first transceiver, at least one apparatus to monitor and report transmissions at least during the selected resource, wherein the requesting specifies the selected resource and instructs the at least one second apparatus to obtain sidelink control information or measurements during that resource, the request and reporting being performed directly between apparatuses without base station scheduling;

transmitting, by the first transceiver, the data using the resource; and determining, based at least on one or more monitoring reports received from the at least one apparatus, whether to reschedule the transmission of the data, wherein the selecting and the rescheduling are performed without base station scheduling, wherein determining whether to reschedule comprises comparing the received measurements to values previously measured by the first transceiver before resource selection and the rescheduling determination is further based on periodicity of a configured grant.

11. The method of claim 10, wherein the method further comprises performing, in response to the monitoring report comprising sidelink control information:

determining, in response to the sidelink control information indicating a data transmission scheduled to the apparatus that will occur again, a new set of resources in the set of resource pools, which are usable for transmitting the data, the new set being determined using at least the sidelink control information received;

checking, whether the new set of resources comprises resources suitable for transmitting the data; and performing, in response to the new set of resources comprising one or more suitable resources, rescheduling by selecting a new resource for transmission of the data from the one or more suitable resources.

12. The method of claim 10, wherein the method further comprises performing, in response to the monitoring report comprising information indicating a probability of a collision of the data transmitted and a data transmission to the apparatus:

determining, using at least the information, a probability of the collision; and performing, in response to the probability meeting preset criteria, rescheduling the transmission of the data by re-initiating selecting the resource.

13. The method of claim 12, wherein the method further comprises performing, when the information includes one or more values of signal received power, the determining the probability of the collision either by comparing the one or more values received to a preset threshold, a value not exceeding the threshold indicating that no collision occurred or by comparing the one or more values received to values the first transceiver has measured before selecting the resource, a similar value indicating that no collision occurred.

14. The method of claim 12, wherein the preset criteria comprises quality of service related criteria, and the method further comprises performing using quality of service information relating to the data to be transmitted when determining whether to whether to reschedule the transmission of the data, wherein the quality of service information comprises criticality, latency and periodicity of configured grant.

15. The method of claim 10, wherein the method further comprises performing, in response to the monitoring report comprising information comprising a flag indicating a collision of the data transmitted and a data transmission to the apparatus using quality of service information relating to the data to be transmitted to determine whether to reschedule the transmission of the data.

16. The method of claim 14, wherein the request is sent to a plurality of second apparatuses, and the determining comprises combining monitoring reports received from the plurality of second apparatuses.

17. The method of claim 10, the method further comprising performing:

requesting, by the first transceiver, at least one of the at least one second transceiver, as at least one of the at least one second apparatus, to monitor and report transmissions at least during the resource;

monitoring, by a second transceiver, in response to receiving from the first transceiver a request to monitor and report transmissions, resources for sidelink communications; and causing sending monitoring reports to the first transceiver.

18. The method of claim 17, wherein the method further comprises performing:

determining, in response to receiving from the first transceiver leakage training signals, degrees of isolation between the first transceiver and the second transceiver on corresponding frequencies; and using the degrees of isolation to determine which of the resources to monitor and whether to send in the monitoring report sidelink control information or information indicating a probability of a collision.

19. The method of claim 10, wherein the monitoring report comprises a probability metric indicating likelihood of collision, and the rescheduling is performed only when the probability exceeds a dynamic threshold, wherein the monitoring report further includes measurements of leakage isolation between multiple transceivers of the apparatus, wherein the method further comprises adjusting the rescheduling criteria based on quality of service information including latency budgets for the transmitted data.

20. A non-transitory computer readable medium comprising program instructions that, when executed by an apparatus, cause the apparatus to perform at least one of a first process and a second process, wherein the first process comprises at least the following:

selecting, in response to data to be transmitted via a first transceiver, a resource for transmission of the data from a resource pool for sidelink communications;

requesting at least one apparatus to monitor and report transmissions at least during the resource, wherein the requesting specifies the selected resource and instructs the at least one second apparatus to obtain sidelink control information or measurements during that resource, the request and reporting being performed directly between apparatuses without base station scheduling;

causing transmitting the data using the resource;

determining, based at least on one or more monitoring reports received from the at least one apparatus, whether to reschedule the transmission of the data, wherein the selecting and the rescheduling are performed without base station scheduling, wherein determining whether to reschedule comprises comparing the received measurements to values previously measured by the first transceiver before resource selection and the rescheduling determination is further based on periodicity of a configured grant and wherein the rescheduling determination is further based on periodicity of a configured grant;

wherein the second process comprises at least the following:

monitoring, in response to receiving a request to monitor and report transmissions, resources for sidelink communications; and causing sending monitoring reports.

* * * * *